(12) United States Patent
Wang

(10) Patent No.: US 8,804,467 B2
(45) Date of Patent: Aug. 12, 2014

(54) IMPLEMENTATION METHOD, IMPLEMENTATION DEVICE FOR ELECTRONIC ALARM CLOCK, AND MOBILE COMMUNICATION TERMINAL THEREOF

(75) Inventor: Haiying Wang, Shandong (CN)

(73) Assignee: Hisense Mobile Communications Technology Co., Ltd. (CN)

( * ) Notice: Subject to any disclaimer, the term of this patent is extended or adjusted under 35 U.S.C. 154(b) by 38 days.

(21) Appl. No.: 13/576,500

(22) PCT Filed: Jan. 25, 2011

(86) PCT No.: PCT/CN2011/070555
§ 371 (c)(1),
(2), (4) Date: Aug. 1, 2012

(87) PCT Pub. No.: WO2011/095087
PCT Pub. Date: Aug. 11, 2011

(65) Prior Publication Data
US 2012/0307604 A1    Dec. 6, 2012

(30) Foreign Application Priority Data
Feb. 2, 2010   (CN) .......................... 2010 1 0110249

(51) Int. Cl.
G04G 13/02     (2006.01)
H04M 1/21      (2006.01)
H04M 1/725     (2006.01)

(52) U.S. Cl.
CPC .............. *G04G 13/023* (2013.01); *H04M 1/21* (2013.01); *H04M 1/72566* (2013.01)
USPC .............. 368/245; 368/250; 368/263; 368/13

(58) Field of Classification Search
USPC .............. 368/244, 245, 263, 248, 73, 250, 13
See application file for complete search history.

(56) References Cited

U.S. PATENT DOCUMENTS

| | | | |
|---|---|---|---|
| 4,076,968 A * | 2/1978 | Wattenbarger | 379/373.02 |
| 6,084,959 A | 7/2000 | Yun | |
| 6,888,779 B2 * | 5/2005 | Mollicone et al. | 368/10 |
| 7,136,482 B2 * | 11/2006 | Wille | 379/373.02 |
| 2003/0142591 A1 * | 7/2003 | Baweja et al. | 368/263 |
| 2007/0025189 A1 * | 2/2007 | Wang et al. | 368/243 |
| 2007/0297292 A1 * | 12/2007 | Kraft et al. | 368/73 |

FOREIGN PATENT DOCUMENTS

| | | |
|---|---|---|
| CN | 101048945 A | 10/2007 |
| CN | 101374309 A | 2/2009 |
| CN | 101795323 A | 8/2010 |
| JP | 2004-242050 A | 8/2004 |

* cited by examiner

*Primary Examiner* — Amy Cohen Johnson
*Assistant Examiner* — Matthew Powell
(74) *Attorney, Agent, or Firm* — DLA Piper LLP (US)

(57) ABSTRACT

The present invention provides an implementation method, implementation device for electronic alarm clock, and a mobile communication terminal thereof, the main content of which includes: determining a first time length capable of achieving the alert purpose by learning the time when a user inputs an instruction of stopping shaking and/or ringing during a plurality of shaking and/or ringing processes, and keeping, in a time period, the shaking and/or ringing intensity when the first time length is over, thus enabling the quick alert in the case which avoids frightening the user by abrupt shaking and/or ringing.

12 Claims, 4 Drawing Sheets

IMPLEMENTATION METHOD, IMPLEMENTATION DEVICE FOR ELECTRONIC ALARM CLOCK, AND MOBILE COMMUNICATION TERMINAL THEREOF

The present application is a US National Stage of International Application No. PCT/CN2011/070555, filed 25 Jan. 2011, designating the United States, and claiming the benefit of Chinese Patent Application No. 201010110249.X, filed on Feb. 2, 2010 to Chinese Patent Office, entitled "Implementation Method for Electronic Alarm Clock, Electronic Alarm Clock and Mobile Communication Terminal", which is incorporated herein by reference in its entirety.

FIELD OF THE INVENTION

The present invention relates to the field of electronic technology, in particular to an implementation method and an implementation device for an electronic alarm clock, and a mobile communication terminal.

BACKGROUND OF THE INVENTION

An electronic alarm clock is an important apparatus for alert in our daily life and work, and that embedded in a mobile phone for achieving an indispensable function of the mobile phone has increasingly been widely accepted by users as an alert apparatus for alert, memo and the like. With the utilization of electronic alarm clocks and popularization of electronic alarm clocks in mobile phones, some problems emerge in their use.

When a customized time of an electronic alarm clock is up, the clock will enter an alert mode (including shake and ring), in which if the shake is weak or the ringing tone volume is small, a user often cannot be aware of it, thus failing to achieve the alert purpose; and if the shake is too strong or the ringing tone volume is large, the user may be frightened by abrupt shaking and/or ringing, especially when the user is in sleep and then suddenly waken up, sudden acceleration of heart beat could be aroused, thereby causing serious cardiovascular injury to human body.

In view of the foregoing problems, there is a need of an electronic alarm clock with a more humanized alert function. Thus an electronic alarm clock with an optical detection function comes out as required, the working principle of which is to set the ringing tone volume in a ringing alert mode according to the light intensity of the place where the electronic alarm clock is located. However, the optical detection function can be affected by many factors including weather, season, the location of the electronic alarm clock, etc., and therefore the foregoing problems can not be properly solved by means of setting the ringing tone volume in such a way, and the purpose of alerting within the shortest time on the premise of giving the user good experience can not be achieved.

SUMMARY OF THE INVENTION

In the embodiments of the present invention, an implementation method, an implementation device for an electronic alarm clock, and a mobile communication terminal are provided, so as to solve the problem that traditional electronic alarm clocks can not realize the purpose of alerting within the shortest time on the premise of giving the user good experience.

An implementation method for an electronic alarm clock, including:

when a customized time is up, starting shaking and/or ringing according to a preset initial shaking and/or ringing intensity, and gradually increasing the shaking and/or ringing intensity during the shaking and/or ringing process;

continuing shaking and/or ringing at the shaking and/or ringing intensity when a first time length, starting from the time when the customized time is up, is over, if an instruction of stopping shaking and/or ringing is not received within the first time length, wherein, the first time length is determined according to the time lengths from starting to finishing shaking and/or ringing during previous N times of shaking and/or ringing, and N is a natural number.

An implementation device for the electronic alarm clock, including:

a memory module configured to store the preset initial shaking and/or ringing intensity and a first time length starting from the time when the customized time is up, wherein the first time length is determined according to the time lengths from to finishing shaking and/or ringing during previous N times of shaking and/or ringing, and N is a natural number;

a detection module configured to detect whether the instruction of stopping shaking and/or ringing is received within the first time length starting from the time when the customized time is up;

a shaking and/or ringing module configured to start shaking and/or ringing according to the initial shaking and/or ringing intensity, when the customized time is up, and gradually increasing the shaking and/or ringing intensity during the shaking and/or ringing process; and to continue shaking and/or ringing at the shaking and/or ringing intensity when the first time length is over if the detection result of the detection module is that the instruction of stopping shaking and/or ringing is not received within the first time length.

A mobile communication terminal includes the implementation device for the electronic alarm clock.

In the embodiments of the present invention, the first time length capable of achieving the alert purpose is determined by learning the time when the user inputs the instruction of stopping shaking and/or ringing during a plurality of shaking and/or ringing processes; and the shaking and/or ringing intensity when the first time length is over is kept in a time period, thus enabling quick alert in the case which avoids frightening the user by abrupt shaking and/or ringing.

DETAILED DESCRIPTION OF THE EMBODIMENT

In order to achieve the aim of the present invention, an electronic alarm clock with the functions of self-learning and auto-regulating alert mode is proposed in the embodiments of the present invention. There is an "intelligent alarm clock" menu in a human-machine operation interface provided by the electronic alarm clock for a user. When the user chooses to enable the intelligent alarm clock, the electronic alarm clock will dynamically learn the user's habits according to the time lengths, from starting to finishing shaking and/or ringing, recorded during a plurality of times of shaking and/or ringing in its operating processes, and customize a proper alert mode while conforming to the user's habits, thus realizing the purpose of fastest alert without disturbing the user.

Now the embodiments of the present invention will be described in detail in conjunction with the accompanying drawings of the description.

The shaking and/or ringing intensity involved in the embodiments of the present invention includes shaking intensity and ringing intensity. Assume the electronic alarm clock is a device embedded in a mobile communication terminal (such as a mobile phone), the shaking and/or ringing processes can depend respectively upon a motor and a speaker in the mobile phone for their implementation. According to the alert mode customized by the alarm clock plan, only one or both of shaking alert and ringing alert can be selected.

Figure 1:
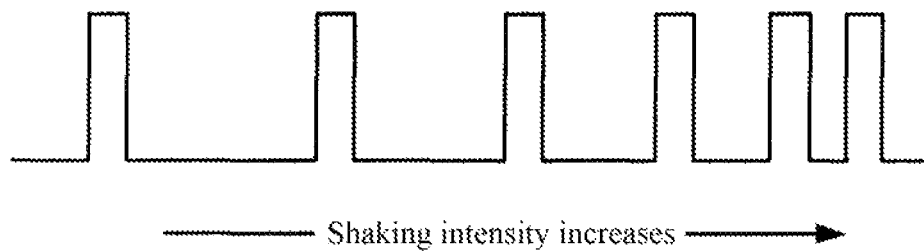
FIG. 1 is a schematic view of the change of shaking intensity.

The magnitude of the shaking intensity is changed mainly depending on the motor. For example, when the shaking intensity is weak, the time interval of every two shaking starts of the motor can be set to 5 seconds; and when the shaking intensity is strong, the time interval becomes 1 second. FIG. 1 is a schematic view of the change of shaking intensity. It can be seen from FIG. 1 that the stronger the shaking intensity is, the higher the starting frequency of the motor becomes. In this respect, the starting and closing of the motor can be achieved by means of the control of a base band circuit in the mobile phone.

Figure 2:
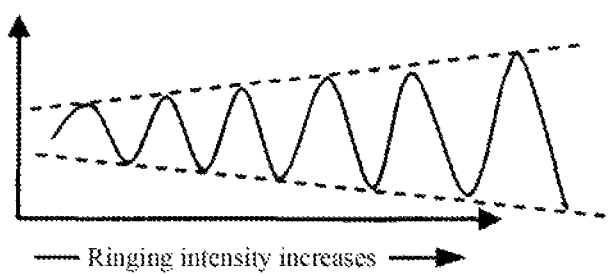
FIG. 2 is a schematic view of the change of ringing intensity.

The magnitude of the ringing intensity means the magnitude of ringing tone volume. When the ringing intensity is weak, the mobile phone has small ringing tone volume; and when the ringing intensity is strong, the mobile phone has large ringing tone volume. FIG. 2 is a schematic view of the change of ringing intensity. It can be seen from FIG. 2 that the larger the amplitude of a ringing signal is, the larger the tone becomes. The magnitude of the ringing intensity can be realized by means of a gain adjusting unit in a CODEC (encoder/decoder) inside the mobile phone.

The implementation scheme and implementation device for the electronic alarm clock in the embodiment of the present invention can be used in various services with the alert function, such as incoming call, note book and memo services, etc.

Figure 3:
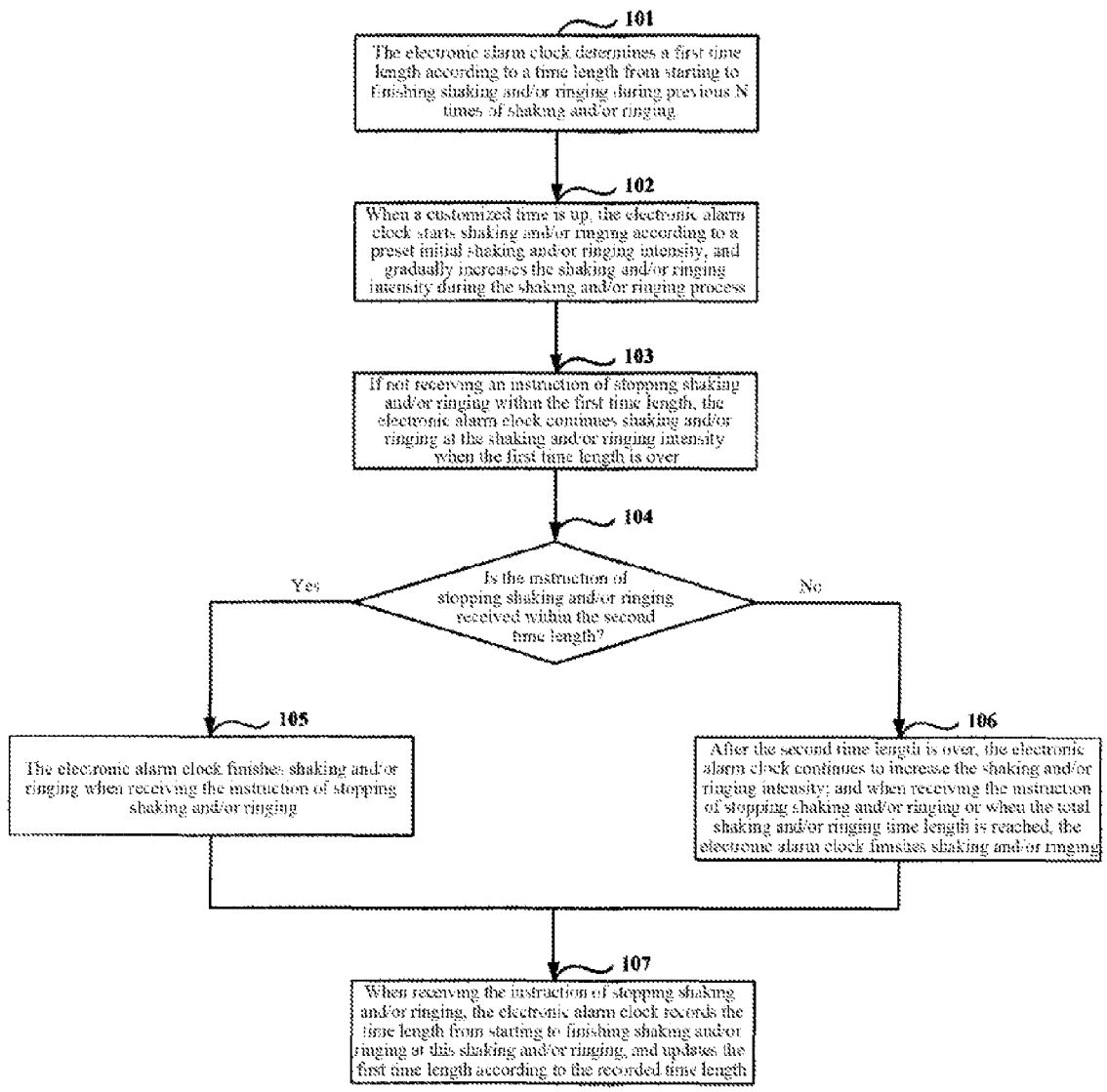
FIG. 3 is a schematic view of an implementation method for an electronic alarm clock according to the first embodiment of the present invention.

The First Embodiment:

As shown in FIG. 3 that is a schematic view of an implementation method for an electronic alarm clock according to the first embodiment of the present invention. Assuming that the implementation device for the electronic alarm clock is the electronic alarm clock in the scheme of the first embodiment, the method includes the following steps:

step 101: the electronic alarm clock determines the first time length according to the time lengths from starting to finishing shaking and/or ringing during previous N times of shaking and/or ringing.

wherein, N is a natural number, and the first time length starts from the moment when the customized time is up.

Figure 4:
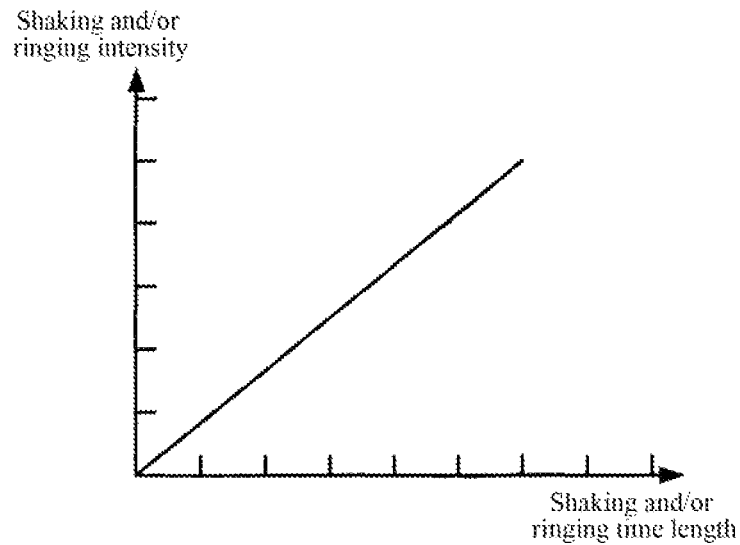
FIG. 4 is a schematic view of the relation between shaking and/or ringing intensity and shaking and/or ringing time length when the alarm clock plan is implemented for the first time according to the first embodiment of the present invention.

When the set alarm clock plan is implemented for the first time, shaking and/or ringing intensity becomes stronger (either in a linear or non-linear manner) as its time length increases, wherein the relation between the shaking and/or ringing intensity becoming larger in a linear manner and the shaking and/or ringing time length is as shown in FIG. 4 (assume that the initial shaking and/or ringing intensity is 0). In response to the shaking and/or ringing, the user inputs an instruction of stopping shaking and/or ringing to the electronic alarm clock through a human-machine interaction interface; and after receiving the instruction of stopping shaking and/or ringing, the electronic alarm clock finishes shaking and/or ringing, records the time length from starting to finishing shaking and/or ringing, and at the same time, can also record the shaking and/or ringing intensity when finishing shaking and/or ringing. When the alarm clock plan is implemented for the second time, the time length from starting to finishing shaking and/or ringing recorded during the implementation for the first time can be used as the first time length; and when the alarm clock plan is implemented for the (N+1)th time, the first time length can be determined according to the time lengths from starting to finishing shaking and/or ringing recorded during previous N times of implementation.

step 102: when the customized time is up, the electronic alarm clock starts shaking and/or ringing according to the preset initial shaking and/or ringing intensity, and gradually increases the shaking and/or ringing intensity during the shaking and/or ringing process.

Given that the environment where the electronic alarm clock is located when the alarm clock plan starts to be implemented each time may be different, the sound in the surrounding environment of the electronic alarm clock is processed and analyzed to obtain the surrounding environmental noise; and the initial shaking and/or ringing intensity at the time of starting shaking and/or ringing will be adjusted according to the magnitude of the surrounding environmental noise, so that the intensity of shaking and/or ringing for alert will be correspondingly increased if the electronic alarm clock is in an environment with larger noise.

In this particular step, at a set moment before the alarm clock plan starts to be implemented for the (N+1)th time (for example, 3 minutes before the customized time is up), the surrounding environmental noise of the electronic alarm clock is collected, the corresponding shaking and/or ringing intensity is determined according to the level of the collected environmental noise, and the determined shaking and/or ringing intensity is used as the initial shaking and/or ringing intensity. The sound collecting device depends upon a base band chip in the mobile phone for implementation of sound collection, involving work of noise collection, filtering processing, analog to digital conversion, operation, etc. The means of collecting the environmental noise is as follows: picking up, by an MIC (microwave integrated circuit) in mobile phone, acoustic signals; filtering, by a filtering processing circuit, useless signals picked up by the MIC, only environmental noise signals left; converting, by an analog to digital conversion circuit, the signals collected by the MIC into digital signals; and first converting, by an operational circuit, the digital signals into frequency domain signals using FFT algorithm, then extracting signal intensity at required frequency point according to the algorithm, and introducing a weight A for convolution operation to eventually obtain a numerical value representing the current environmental noise.

step 103: if not receiving the instruction of stopping shaking and/or ringing within the first time length, the electronic alarm clock continues shaking and/or ringing at the shaking and/or ringing intensity when the first time length is over.

By adopting the scheme in the aforementioned steps 101-103 and by learning the user's habit during the user utilizing the electronic alarm clock in his daily life, a shaking and/or ringing time length which can arrive at the aim of alerting the user, namely the first time length, can be obtained. Then in a time period after the first time length, the shaking and/or ringing intensity when the first time length is over is kept, thus alerting the user at the minimal shaking and/or ringing intensity capable of realizing the alert purpose.

Further, after the step 103, the implementation process for the electronic alarm clock may also include the following steps:

step 104: the electronic alarm clock detects whether the instruction of stopping shaking and/or ringing is received within a second time length, and if yes, the step 105 is executed, and if not, the step 106 is executed.

The second time length is a time length starting at the moment when the first time length is over, and in the second time length, the electronic alarm clock continues shaking and/or ringing at the shaking and/or ringing intensity when the first time length is over.

The sum of the first time length and the second time length is not greater than the total shaking and/or ringing time length set by the alarm clock plan, that is, if the total shaking and/or ringing time length set by the alarm clock plan is 1 minute, the sum of the first time length and the second time length should be not greater than 1 minute.

step 105: the electronic alarm clock finishes shaking and/or ringing when receiving the instruction of stopping shaking and/or ringing.

step 106: after the second time length is over, the electronic alarm clock increases shaking and/or ringing intensity and continues shaking and/or ringing, and when receiving the instruction of stopping shaking and/or ringing or when the total shaking and/or ringing time length is reached, the electronic alarm clock finishes shaking and/or ringing.

Figure 5:
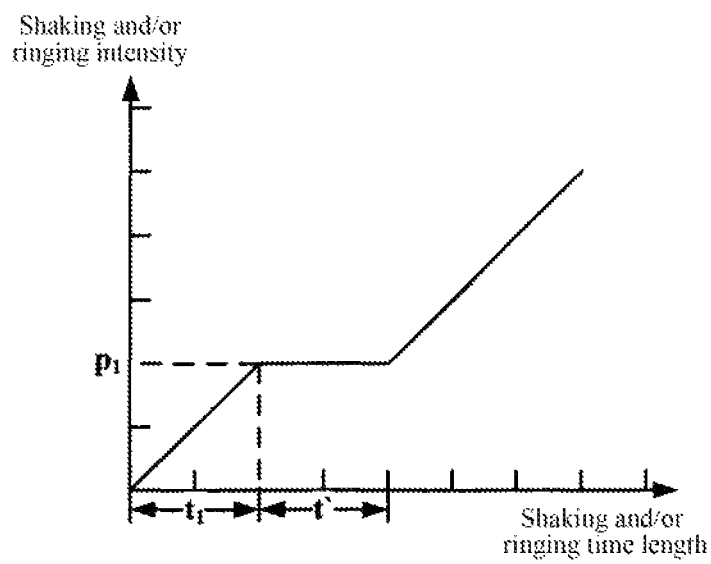
FIG. 5 is a schematic view of the relation between shaking and/or ringing intensity and shaking and/or ringing time length when the alarm clock plan is not implemented for the first time according to the first embodiment of the present invention.

The relation between the shaking and/or ringing intensity and the shaking and/or ringing time length when the set alarm clock plan is not implemented for the first time is as shown in FIG. 5 (assume that the initial shaking and/or ringing intensity is 0), it can be seen from FIG. 5 that a first time length $t_1$ and a shaking and/or ringing intensity $p_1$ when the first time length is over are obtained by means of training and learning the time lengths from starting shaking and/or ringing to finishing shaking and/or ringing during previous N times of shaking and/or ringing, wherein these two parameters represent that when the shaking and/or ringing intensity reaches $p_1$, or when the shaking and/or ringing time length reaches $t_1$, the purpose of alerting the user can be realized. In order to enable the user to enjoy the alert service better, when the alarm clock plan is not implemented for the first time, a second time length t' is set at $p_1$, which means the shaking and/or ringing intensity $p_1$ is kept for a duration of t'.

If the instruction of stopping shaking and/or ringing is still not received or if the total shaking and/or ringing time length is not reached when the shaking and/or ringing intensity reaches its maximum, the electronic alarm clock will keep the maximal shaking and/or ringing intensity; and if the instruction of stopping shaking and/or ringing has not been received by the time when the total shaking and/or ringing time length is reached, the electronic alarm clock will stop shaking and/or ringing when the total shaking and/or ringing time length is reached.

By adopting the scheme in the aforementioned steps 101-106, the alert function in this alarm clock plan is realized, and the purpose of comfortably and rapidly alerting the user is also achieved while the alert speed and the user's experience about the service when being alerted are taken into consideration.

Further, in order to enable the first time length used when the next electronic alarm clock plan is implemented to correctly reflect the user's habit, the first time length can be updated according to the time length from starting to finishing shaking and/or ringing at this shaking and/or ringing, which in particular includes:

step 107: when receiving the instruction of stopping shaking and/or ringing, the electronic alarm clock records the time length from starting to finishing shaking and/or ringing at this shaking and/or ringing, and updates the first time length according to the recorded time length.

Specially, if the electronic alarm clock automatically finishes shaking and/or ringing when the total shaking and/or ringing time length is reached, that is, it finishes shaking and/or ringing without receiving the instruction of stopping shaking and/or ringing, it is believed that the electronic alarm clock is not at the user's side, then the this shaking and/or ringing event will be ignored by the system, and the parameters set for the current shaking and/or ringing will not be changed.

The methods of updating the first time length include, but not limited to, the following two methods:

the first updating method:

If, in the implementation process of the this alarm clock plan, the user inputs the instruction of stopping shaking and/or ringing within the second time length, that is, the recorded time length from to finishing shaking and/or ringing at this shaking and/or ringing is not smaller than the first time length and not greater than the sum of the first time length and the second time length, it means that the set first time length can correctly represent the user's habit, and then the first time length will be kept unchanged when the next alarm clock plan is implemented.

If, in the implementation process of the this alarm clock plan, the user does not respond within the second time length, that is, the recorded time length from staring to finishing shaking and/or ringing at this shaking and/or ringing is greater than the sum of the first time length and the second time length, it means that the shaking and/or ringing intensity for alert is insufficient, and then the first time length needs to be increased.

If, in the implementation process of the this alarm clock plan, the user inputs the instruction of stopping shaking and/or ringing within the first time length, that is, the recorded time length from staring shaking and/or ringing to finishing shaking and/or ringing at this shaking and/or ringing is smaller than the first time length, it means that the set first time length is too large, and the first time length needs to be reduced.

the second updating method:

The updated first time length is obtained according to the following formula (1):

$$\frac{t_1 \times N + t_0}{N+1} = t_{1(updated)}, \quad (1)$$

wherein, $t_{1\ (updated)}$ represents the updated first time length; $t_1$ represents the used first time length at this shaking and/or ringing; $t_0$ represents the recorded shaking and/or ringing time length at this shaking and/or ringing; and N represents the times from staring to finishing shaking and/or ringing before this shaking and/or ringing, and N can be either a fixed value or a dynamically variable value.

As the first time length is updated, the shaking and/or ringing intensity when the first time length is over should also be updated, and particularly, the updated continuous shaking and/or ringing intensity can be obtained according to the following formula (2):

$$\frac{p_1 \times N + p_0}{N+1} = p_{1(updated)}, \quad (2)$$

wherein, $p_{1\ (updated)}$ represents the updated continuous shaking and/or ringing intensity; $p_1$ represents the used continuous shaking and/or ringing intensity at this shaking and/or ringing; $p_0$ represents the recorded shaking and/or ringing intensity when the shaking and/or ringing is finished at this shaking and/or ringing; and N represents the times from staring to finishing shaking and/or ringing before this shaking and/or ringing.

Figure 6:
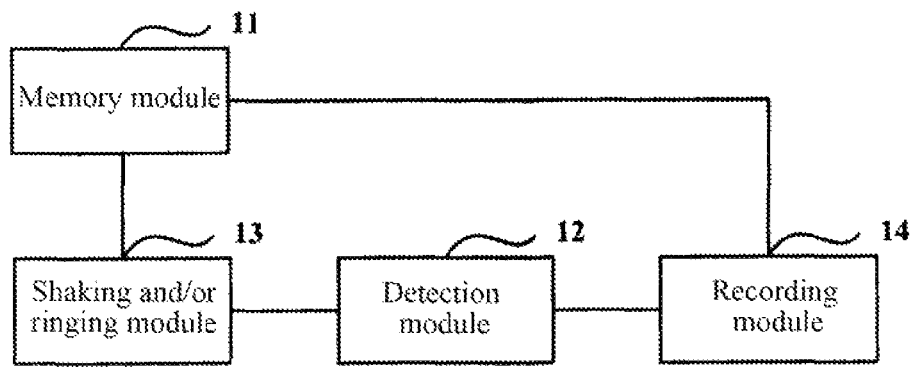
FIG. 6 is a schematic structural diagram of an implementation device for electronic alarm clock according to the second embodiment of the present invention.

The Second Embodiment:

An implementation device for the electronic alarm clock is further proposed in the second embodiment of the present invention. As shown in FIG. 6, the implementation device for the electronic alarm clock includes a memory module 11, a detection module 12 and a shaking and/or ringing module 13, wherein the memory module 11 is configured to store the preset initial shaking and/or ringing intensity and a first time length starting from the time when the customized time is up, and the first time length is determined according to the time lengths from starting to finishing shaking and/or ringing during previous N times of shaking and/or ringing, and N is a natural number; the detection module 12 is configured to detect whether the instruction of stopping shaking and/or ringing is received within the first time length starting from the time when the customized time is up; and the shaking and/or ringing module 13 is configured to start shaking and/or ringing according to the initial shaking and/or ringing intensity, when the customized time is up, and gradually increasing the shaking and/or ringing intensity during the shaking and/or ringing process, and to continue shaking and/or ringing at the shaking and/or ringing intensity when the first time length is over if the detection result of the detection module 12 is that the instruction of stopping shaking and/or ringing is not received within the first time length.

The initial shaking and/or ringing intensity stored in the memory module 11 is determined according to the level of environmental noise at the set moment and the shaking and/or ringing intensity corresponding to the level of environmental noise.

The detection module 12 is further configured to detect whether the instruction of stopping shaking and/or ringing is received within the second time length starting from the time when the first time length is over, wherein in the second time length, the electronic alarm clock continues shaking and/or ringing at the shaking and/or ringing intensity when the first time length is over, and the sum of the first time length and the second time length is not greater than the total shaking and/or ringing time length; the shaking and/or ringing module 13 is further configured to finish shaking and/or ringing if the detection result of the detection module is that the instruction of stopping shaking and/or ringing is received within the second time length, to continue to increase the shaking and/or ringing intensity and to continue shaking and/or ringing after the second time length is over if the detection result of the detection module is that the instruction of stopping shaking and/or ringing is not received within the second time length, and to finish shaking and/or ringing when receiving the instruction of stopping shaking and/or ringing or when the total shaking and/or ringing time length is reached.

The implementation device for the electronic alarm clock further includes a recording module 14 configured to record the time length from starting to stopping shaking and/or ringing at this shaking and/or ringing, when receiving the instruction of stopping shaking and/or ringing; and the memory module 11 is also configured to update the first time length according to the recorded time length and to store the updated first time length.

The memory module 11 is particularly configured to shorten the first time length if the recorded time length from starting to finishing shaking and/or ringing at this shaking and/or ringing is smaller than the first time length, to keep the first time length unchanged if the recorded time length from staring to finishing shaking and/or ringing at this shaking and/or ringing is not smaller than the first time length and not greater than the sum of the first time length and the second time length, and to increase the first time length if the recorded time length from staring to finishing shaking and/or ringing at this shaking and/or ringing is greater than the sum of the first time length and the second time length.

The memory module 11 is particularly configured to obtain the updated first time length according to the following formula:

$$\frac{t_1 \times N + t_0}{N+1} = t_{1(updated)}$$

wherein $t_{1\ (updated)}$ represents the updated first time length, $t_1$ represents the used first time length at this shaking and/or ringing; $t_0$ represents the recorded shaking and/or ringing time length at this shaking and/or ringing; and N represents the times from staring to finishing shaking and/or ringing before this shaking and/or ringing.

Meanwhile, the memory module 11 can also be configured to update the shaking and/or ringing intensity when the first time length is over and to store the updated shaking and/or ringing intensity.

The memory module 11 is particularly configured to obtain the updated shaking and/or ringing intensity when the first time length is over according to the following formula:

$$\frac{p_1 \times N + p_0}{N+1} = p_{1(updated)}$$

wherein $p_{1\ (updated)}$ represents the updated shaking and/or ringing intensity when the first time length is over, $p_1$ represents the used shaking and/or ringing intensity when the first time length is over at this shaking and/or ringing; $p_0$ represents the recorded shaking and/or ringing intensity when the shaking and/or ringing is finished at this shaking and/or ringing; and N represents the times from staring to finishing shaking and/or ringing before this shaking and/or ringing.

The Third Embodiment:

A mobile communication terminal is proposed in the third embodiment of the present invention, the mobile communication terminal includes the implementation device for the electronic alarm clock involved in the second embodiment, and can achieve the implementation process for the electronic alarm clock in the first embodiment.

Figure 7:
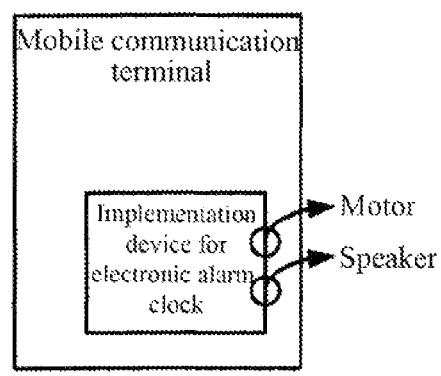
FIG. 7 is a schematic structural diagram of a mobile communication terminal according to the third embodiment of the present invention.
Figure 8:
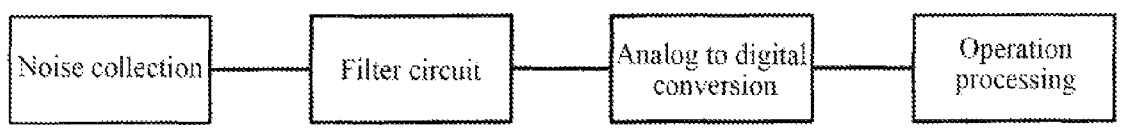
FIG. 8 is a schematic structural diagram of a base band circuit according to the third embodiment of the present invention.

As shown in FIG. 7 that is a schematic structural diagram of the mobile communication terminal in the third embodiment, it can be seen that the particular structure of the electronic alarm clock contained in the mobile communication terminal is the same as the structure of the implementation device for the electronic alarm clock in the second embodiment, wherein the shaking and/or ringing module can be composed of elements, including the MIC, the motor and the speaker, etc. in the electronic alarm clock; and the memory module can be composed of the base band circuit of the electronic alarm clock, the structure of the memory module is as shown in FIG. 8, mainly involving noise collection, filter circuit, analog to digital conversion, and operation processing.

The memory module in the implementation device for the electronic alarm clock determines the current environmental noise through the base band circuit, and then determines the initial shaking and/or ringing intensity; the shaking and/or ringing module triggers the motor or the speaker to start shaking and/or ringing according to the initial shaking and/or ringing intensity, and gradually increases the shaking and/or ringing intensity during the shaking and/or ringing process; and further, the detection module detects whether the instruction of stopping shaking and/or ringing is received within the first time length, and if no, the shaking and/or ringing module indicates the motor or the speaker to continue shaking and/or ringing at the shaking and/or ringing intensity when the first time length is over.

The shaking and/or ringing module also indicates the motor or speaker to finish shaking and/or ringing, if the detection result of the detection module is that the instruction of stopping shaking and/or ringing is received within the second time length; continues to increase the shaking intensity of the motor or the tone of the speaker and continues shaking and/or ringing after the second time length is over, if the detection result of the detection module is that the instruction of stopping shaking and/or ringing is not received within the second time length; and finishes shaking and/or ringing when receiving the instruction of stopping shaking and/or ringing or the total shaking and/or ringing time length is over.

Likewise, the memory module updates the first time length according to the time length recorded by the recording module.

By using the implementation method, the implementation device for the electronic alarm clock, and the mobile communication terminal comprising the implementation device for the electronic alarm clock proposed in the embodiments of the present invention, the fastest alert without frightening the user can be achieved; and the effect of alert tends to be optimal by means of continuously learning the user's habit; meanwhile, regarding the shaking and/or ringing intensity for alerting the user, noise of the environment where the electronic alarm clock is located is also taken into account, thus enabling the user to experience relatively consistent shaking and/or ringing intensity in different environments; in addition, if the electronic alarm clock is embedded in a mobile phone, the scheme of the present invention can be realized by means of the MIC, the motor, the speaker and the base band circuit built in the mobile phone, and software can be realized depending upon the mobile phone software platform, thus the requirement on software and hardware functions is low and the portability is strong.

It will be understood by those skilled in the art that the embodiments of the present invention can be implemented as methods or computer program products. Therefore, the present invention can adopt all hardware embodiments, all software embodiments, or combination of hardware and software embodiments. Moreover, the present invention can involve computer program products implemented on one or more computer usable memory media (including, but not limited to, disk memory, CD-ROM (compact disk-read only memory), optical memory, etc.) containing computer usable program codes.

The present invention is described with reference to the flow charts and/or block diagrams of the methods, devices (systems) and computer program products of the embodiments of the present invention. It should be understood that each flow and/or block in the flow charts and/or block diagrams, and the combinations of flows and/or blocks in the flow charts and/or block diagrams can be implemented by computer program instructions. These computer program instructions can be provided for a processor in a general computer, a special-purpose computer, an embedded processing machine or other programmable data processing equipment, so as to produce a machine, thus creating a device for implementing the functions designated by one or more flows in the flow charts and/or one or more blocks in the block diagrams through the instructions executed by the processor in computer or other programmable data processing equipment.

These computer program instructions can also be stored in a computer readable memory capable of guiding the processor in computer or other programmable data processing equipment to operate in a specific way, so that the instructions stored in the computer readable memory can produce a product comprising the instruction device for implementing the functions designated by one or more flows in the flow charts and/or one or more blocks in the block diagrams.

These computer program instructions can also be loaded to computer or other programmable data processing equipment, so as to execute a series of operational steps on computer or other programmable data processing equipment to generate processing implemented by a computer, so that the instructions executed on computer or other programmable data processing equipment can provide steps for implementing the functions designated by one or more flows in the flow charts and/or one or more blocks in the block diagrams.

Although the preferred embodiments of the present invention are herein described, other alterations and modifications of these embodiments can be made by those skilled in the art, once they have learned the basic innovation concept. Therefore, the appended claims are intended to be interpreted as comprising the preferred embodiments and all alterations and modifications fallen into the scope of the present invention.

Obviously, those skilled in the art could make various modifications and variations of the present invention without departing from the spirit and scope of the present invention. As a result, if these modifications and variations of the present invention fall into the scopes of the claims of the present invention and equivalent techniques thereof, the present invention is also intended to include these modifications and variations.

The invention claimed is:

1. An implementation method for an electronic alarm clock, wherein the method comprises:

starting, shaking and/or ringing according to a preset initial shaking and/or ringing intensity when current time reaches a customized time, and gradually increasing the shaking and/or ringing intensity during a shaking and/or ringing process;

continuing shaking and/or ringing at the shaking and/or ringing intensity when a first time length, starting from the time when the current time reaches the customized time, is over, if an instruction of stopping shaking and/or ringing is not received within the first time length;

wherein the first time length is determined according to time lengths from starting to finishing shaking and/or ringing during previous N times of shaking and/or ringing, and N is a natural number;

when receiving the instruction of stopping shaking and/or ringing, recording the time length from starting to finishing shaking and/or ringing at this shaking and/or ringing, and updating the first time length according to the recorded time length, wherein updating the first time length according to the recorded time length comprises:

obtaining the updated first time length according to:

$$\frac{t_1 \times N + t_0}{N + 1} = t_{1(updated)}$$

wherein t1 (updated) represents the updated first time length, t1 represents the used first time length at this shaking and/or ringing; t0 represents the recorded shaking and/or ringing time length at this shaking and/or ringing; and N represents the times from starting to finishing shaking and/or ringing this shaking and/or ringing.

2. The method according to claim 1, wherein after continuing shaking and/or ringing at the shaking and/or ringing intensity when the first time length is over, the method further comprises:

finishing shaking and/or ringing if the instruction of stopping shaking and/or ringing is received within a second time length starting from the time when the first time length is over; and continuing to increase the shaking and/or ringing intensity and continuing shaking and/or ringing after the second time length is over if the instruction of stopping shaking and/or ringing is not received within the second time length, and finishing shaking and/or ringing when receiving the instruction of stopping shaking and/or ringing or when the total shaking and/or ringing time length is reached, wherein in the second time length, the electronic alarm clock continues shaking and/or ringing at the shaking and/or ringing intensity when the first time length is over, and the sum of the first time length and the second time length is not greater than the total shaking and/or ringing time length.

3. The method according to claim 1, wherein updating the first time length according to the recorded time length comprises:

shortening the first time length if the recorded time length from starting to finishing shaking and/or ringing at this shaking and/or ringing is smaller than the first time length;

keeping the first time length unchanged if the recorded time length from starting to finishing shaking and/or ringing at this shaking and/or ringing is not smaller than the first time length and not greater than the sum of the first time length and the second time length;

increasing the first time length if the recorded time length from starting to finishing shaking and/or ringing at this shaking and/or ringing is greater than the sum of the first time length and the second time length.

4. The method according to claim 1, wherein after the first time length is updated, the method further comprises:

updating the shaking and/or ringing intensity when the first time length is over; and when the current time reaches the customized time again, continuing shaking and/or ringing at the updated shaking and/or ringing intensity when the first time length is over, if the instruction of stopping shaking and/or ringing is not received within the updated first time length starting from the time when the current time reaches the customized time.

5. The method according to claim 4, wherein the updated shaking and/or ringing intensity when the first time length is over is obtained according to the following formula:

$$\frac{p_1 \times N + p_0}{N + 1} = p_{1(updated)}$$

wherein $p_{1(updated)}$ represents the updated shaking and/or ringing intensity when the first time length is over, $p_1$ represents the used shaking and/or ringing intensity when the first time length is over at this shaking and/or ringing; $p_0$ represents the recorded shaking and/or ringing intensity when the shaking and/or ringing is finished at this shaking and/or ringing; and N represents the times from starting to finishing shaking and/or ringing before this shaking and/or ringing.

6. The method according to claim 1, wherein the preset initial shaking and/or ringing intensity is obtained by the following processes of:

determining the level of environmental noise at a set moment, determining the corresponding shaking and/or ringing intensity according to the level of environmental noise, and using the determined shaking and/or ringing intensity as the preset initial shaking and/or ringing intensity.

7. An implementation device for an electronic alarm clock, comprising:

a memory module configured to store a preset initial shaking and/or ringing intensity and a first time length starting from the time when current time reaches a customized time wherein the first time length is determined according to the time lengths from starting to finishing shaking and/or ringing during previous N times of shaking and/or ringing, and N is a natural number;

a detection module configured to detect whether an instruction of stopping shaking and/or ringing is received within the first time length starting from the time when the current time reaches the customized time;

a shaking and/or ringing module configured to start shaking and/or ringing according to the initial shaking and/or ringing intensity when the current time reaches the customized time, and to gradually increase the shaking and/or ringing intensity during a shaking and/or ringing process; and continue shaking and/or ringing at the shaking and/or ringing intensity when the first time length is over if the detection result of the detection module is that the instruction of stopping shaking and/or ringing is not received within the first time length, a recording module configured to record the time length from starting to finishing shaking and/or ringing at this shaking and/or ringing when receiving the instruction of stopping shaking and/or ringing;

the memory module further configured to update the first time length according to the recorded time length and to store the updated first time length, wherein the memory module obtains the updated first time length according to:

$$\frac{t_1 \times N + t_0}{N + 1} = t_{1(updated)}$$

wherein $t_{1(updated)}$ represents the updated first time length, $t_1$ represents the used first time length at this shaking and/or ringing; $t_0$ represents the recorded shaking and/or ringing time length at this shaking and/or ringing; and N represents the times from starting to finishing shaking and/or ringing before this shaking and/or ringing.

8. The implementation device for the electronic alarm clock according to claim 7, wherein the detection module is further configured to detect whether the instruction of stopping shaking and/or ringing is received within the second time length starting from the time when the first time length is over, wherein, in the second time length, the electronic alarm clock continues shaking and/or ringing at the shaking and/or ringing intensity when the first time length is over, and the sum of the first time length and the second time length is not greater than the total shaking and/or ringing time length;

the shaking and/or ringing module is further configured to finish shaking and/or ringing if the detection result of the detection module is that the instruction of stopping shaking and/or ringing is received within the second time length; to continue to increase the shaking and/or ringing intensity and continue shaking and/or ringing after the second time length is over if the detection result of the detection module is that the instruction of stopping shaking and/or ringing is not received within the second time length; and to finish shaking and/or ringing when receiving the instruction of stopping shaking and/or ringing or the total shaking and/or ringing time length is reached.

9. The implementation device for the electronic alarm clock according to claim 7, wherein:

the memory module is configured to update the shaking and/or ringing intensity when the first time length is over and to store the updated shaking and/or ringing intensity.

10. A mobile communication terminal comprising an implementation device for an electronic alarm clock, wherein the implementation device for the electronic alarm clock comprises:

a memory module configured to store a preset initial shaking and/or ringing intensity and a first time length starting from the time when current time reaches a customized time, wherein the first time length is determined according to the time lengths from starting to finishing shaking and/or ringing during previous N times of shaking and/or ringing, and N is a natural number;

a detection module configured to detect whether an instruction of stopping shaking and/or ringing is received within the first time length starting from the time when the current time reaches the customized time;

a shaking and/or ringing module configured to start shaking and/or ringing according to the initial shaking and/or ringing intensity when the current time reaches the customized time, and to gradually increase the shaking and/or ringing intensity during a shaking and/or ringing process; and continue shaking and/or ringing at the shaking and/or ringing intensity when the first time length is over if the detection result of the detection module is that the instruction of stopping shaking and/or ringing is not received within the first time length, a recording module configured to record the time length from starting to finishing shaking and/or ringing at this shaking and/or ringing when receiving the instruction of stopping shaking and/or ringing;

the memory module further configured to update the first time length according to the recorded time length and to store the updated first time length, wherein the memory module obtains the updated first time length according to:

$$\frac{t_1 \times N + t_0}{N + 1} = t_{1(updated)}$$

wherein $t_{1(updated)}$ represents the updated first time length, $t_1$ represents the used first time length at this shaking and/or ringing; $t_0$ represents the recorded shaking and/or ringing time length at this shaking and/or ringing; and N represents the times from starting to finishing shaking and/or ringing before this shaking and/or ringing.

11. The mobile communication terminal according to claim 10, wherein the detection module is further configured to detect whether the instruction of stopping shaking and/or ringing is received within the second time length starting from the time when the first time length is over, wherein, in the second time length, the electronic alarm clock continues shaking and/or ringing at the shaking and/or ringing intensity when the first time length is over, and the sum of the first time length and the second time length is not greater than the total shaking and/or ringing time length;

the shaking and/or ringing module is further configured to finish shaking and/or ringing if the detection result of the detection module is that the instruction of stopping shaking and/or ringing is received within the second time length; to continue to increase the shaking and/or ringing intensity and continue shaking and/or ringing after the second time length is over if the detection result of the detection module is that the instruction of stopping shaking and/or ringing is not received within the second time length; and to finish shaking and/or ringing when receiving the instruction of stopping shaking and/or ringing or the total shaking and/or ringing time length is reached.

12. The mobile communication terminal according to claim 10, wherein:

the memory module is configured to update the shaking and/or ringing intensity when the first time length is over and to store the updated shaking and/or ringing intensity.

* * * * *